Patented Jan. 6, 1942

2,268,611

UNITED STATES PATENT OFFICE 2,268,611

PROCESS OF LAMINATING

James A. Mitchell, Kenmore, N. Y., assignor to E. I. du Pont de Nemours & Company, Wilmington, Del., a corporation of Delaware No Drawing. Application June 16, 1937, Serial No. 148,515

8 Claims. (Cl. 154—40)

This invention relates to adhesives and more particularly it relates to adhesives containing polymerizable liquid materials which are capable of dissolving other ingredients of adhesive compositions and which will set up as firm bodies upon polymerization.

Previously known adhesives were composed generally of aqueous solutions or solutions in volatile solvents. Both aqueous adhesives and volatile solvent adhesives were dependent upon removal of the solvent before the adhesive action could take place.

The use of an adhesive containing a solvent which must be removed is disadvantageous for certain purposes. First, when applied over fairly large areas of a material which is relatively impervious to vapors, the elimination of the solvent becomes so slow that the bond will attain no strength, or at least will be of very inferior strength for a considerable period of time after forming. Furthermore, when a relatively large area has been coated with such solvents, the solvents will escape first from the edges, causing the cement at the edges to set and thus seal the interior against solvent elimination. As a consequence, the entrapped solvent will tend to form bubbles and may exert a deleterious effect upon the materials being joined or adhered together. The solvent vapors may have a deleterious effect upon objects in the surroundings, such for example as injuring the contents of a package, where they are used in wrapping operations or they may cause sticking between sheets of wrapping material or between packages stacked in the vicinity. Furthermore, they may possess a disagreeable odor or may even prove toxic to the operator. The removal of such toxic and generally injurious vapors at times proves very difficult. Where the solvent used is quite valuable, a more or less elaborate and expensive process for the recovery of the vapors may sometimes be employed.

Most of the adhesive compositions heretofore known for adhering sheet materials consisting of a base sheet, such, for instance, as regenerated cellulose and containing a coating composition upon the surface thereof, act at least partially by penetrating or dissolving the coating composition and forming adhesive contact with the base sheet. This action may at times proceed to such an extent that the solvent passes entirely through the base sheet and strikes the coating on the opposite side of the sheet to render it tacky and even perhaps impair other physical qualities.

It has previously been proposed in order to eliminate solvent difficulties, to employ as adhesives solids which will melt at relatively low temperatures, but still well above room temperature. Certain of the hazards involved in the use of volatile solvents may also be avoided by the dispersion of the adhesive in aqueous or other non-inflammable and non-toxic media. The present invention differs from such proposals however in using a solvent of a particular type so that the composition is actually a solution and is applied as such, but the said solvent, being substantially non-volatile and polymerizable, becomes an integral part of the final adhesive layer by being polymerized in situ.

It is therefore an object of this invention to provide an adhesive which does not require the use of a volatile solvent. It is a further object to provide an adhesive in which the solvent will directly contribute towards the formation of the adhesive bond. It is a still further object to provide a liquid adhesive which may be set up by polymerization in situ. It is still another object to provide such an adhesive which is non-inflammable, resistant towards atmospheric changes and stable under the influence of light. Other objects will appear hereinafter.

In general, the objects of this invention are accomplished by employing as an adhesive a substantially non-volatile, polymerizable liquid which may be polymerized in situ to give a strong adhesive bond. The polymerizable liquid should serve as a solvent for other constituents of the adhesive so that upon polymerization in situ the adhesive composition will form a more or less flexible layer which is preferably moistureproof and transparent.

In the practice of my invention I apply a substance of the class more fully described hereinafter to the surfaces to be joined by adhesion, said substance being in the liquid monomer stage, or in a stage which is still liquid but partially polymerized, which will yield upon further polymerization a strong adhesive bond. Preferably, a small amount of a polymerization catalyst such as benzoyl peroxide is added to the material before application. The surfaces thus coated are firmly pressed together and while held in intimate contact, the polymerization of the material is completed by the application of heat or otherwise. Although a strong adhesive bond is produced by this method for a large variety of materials, it has the disadvantage that the unpolymerized or partially polymerized material applied as adhesive coating is practically non-tacky and as a consequence the surfaces must be held in position until polymerization is effected before a really satisfactory adherence is attained.

In order to overcome this lack of initial tackiness, certain tacky materials may be dissolved in the polymerizable liquids which will make the material immediately effective as an adhesive. The materials which are added to the adhesive may also lend certain desirable characteristics to the resulting product. For instance, where such adhesives are to be used with wrapping tissue, such as regenerated cellulose, substances added might include one or more of the following: wax to give moistureproofness, a cellulose derivative, a gum to act as a blending agent for the wax and the cellulose derivative, a plasticizing agent, and a polymerization catalyst. The following examples, when used as laminating adhesives for regenerated cellulose tissues, will be found to give excellent adhesion and great clarity.

Example A

|  | Grams |
|---|---|
| Ethylene glycol monoethyl ether methacrylate monomer | 50 |
| Nitrocellulose | 3 |
| Hydrogenated ester gum | 5 |
| Benzoyl peroxide | 0.5 |
| Paraffin wax | 0.5 |
| Dibutyl phthalate | 1 |

Example B

|  | Grams |
|---|---|
| Ethylene glycol monoethyl ether methacrylate monomer | 50 |
| Nitrocellulose | 3 |
| Modified rosin (according to the Morton patent) | 6 |
| Benzoyl peroxide | 0.5 |
| Paraffin wax | 0.7 |
| Dibutyl phthalate | 1.1 |

The nitrocellulose used in Examples A and B was that manufactured by the Hercules Powder Co. and sold as Hercules R. S. nitrocellulose, 12.2% nitrogen. Any other low viscosity nitrocellulose such as is commonly employed in lacquer type coating compositions may be used satisfactorily although it is preferable that a nitrocellulose having approximately an equal nitrogen content be selected.

The resin described in the examples as modified rosin is obtained by treating wood rosin with sulfuric acid under conditions such as those described in U. S. Letters Patent No. 2,017,866 to Morton.

The strength of the final adhesive bond after polymerization of the solvent will be far greater than the bond produced by these added materials because of the strong bond produced by the polymerized substance.

In joining materials possessing coatings which are soluble in the polymerizable liquid, the coatings, when moistened with such liquid, may produce the initial state of adhesion or tackiness. For example, in recent years there has been put into wide use a wrapping material comprising a sheet or film of regenerated cellulose coated on one or both sides with a moistureproofing composition. (For the term "moistureproofing composition" as used throughout the specification and claims is meant a composition such as is defined and described in U. S. Patent No. 1,737,187 to Charch and Prindle.) In the formation of tubes, bags, envelopes and other articles from this material it is necessary, in order to preserve the moistureproofness of the article, that good and uniform adhesive contact be secured between different portions of the tube, bag, envelope or other articles in the fabrication of said article. This adhesive contact must be secured without substantially destroying the moistureproof characteristics at the point of contact or impairing the transparency and other desirable qualities of the wrapper. The presence of wax in such moistureproofing compositions presents a peculiar problem in the selection of an adhesive for these materials.

I have discovered that excellent adhesive properties for moistureproof coated film are exhibited by high boiling polymerizable liquids which are solvents for the moistureproof coating. For example, cyclohexyl methacrylate monomer (boiling point 74° C. at 4 mm. mercury) containing a small amount of a polymerization catalyst such as benzoyl peroxide produces a seal with a regenerated cellulose film coated with a moistureproofing composition consisting of a resin, a wax, a cellulose derivative and optionally a plasticizer, the strength of such a seal being decidedly superior to that obtained with a volatile sealing solvent such as ethylene glycol monomethyl ether or acetone as shown by the results of tests Nos. 1, 2 and 3 of Table I set forth below. Other polymerizable solvents produce adhesive bonds of the strength shown in Examples 4, 5 and 9 of Table I. Example 9 is for a solvent which in the monomer stage has a boiling point of about 70° C. at atmospheric pressure. Where slight volatility of the solvent is not detrimental, excellent results may be obtained with these solvents of lower boiling point.

For the purpose of comparison and definition, the following test has been used to measure the strength of an adhesive bond. A narrow strip of adhesive solvent is applied by means of a camel's hair brush to one of two strips of a coated material 1½" wide which are then superimposed one on the other so that the treated face of the film is in contact with a surface of the other strip. A seal is made across the width of the material at one end by placing one film on a metal plate heated to 130° C. and rolling thereover a roller ⅝" wide weighted to 650 grams. The two strips so sealed are opened at the free end and placed in a stretching device such as a Suter testing machine by clipping each end of the sheets in suitable flanges, one of which is fixed while the other is moved away at a constant speed of 12" per minute. The force in grams required to pull the sheets apart is taken as the measure of the adhesive seal bond strength.

TABLE I
Strength of adhesive bond*

| Example | Adhesive | Strength in grams after period of time | | | |
|---|---|---|---|---|---|
| | | 5 min. | 2 hrs. | 24 hrs. | 66 hrs. |
| 1 | Ethylene glycol monomethyl ether | 90 | 90 | 90 | 90 |
| 2 | Acetone | 75 | 75 | 75 | |
| 3 | Cyclohexyl methacrylate monomer + 1% benzoyl peroxide | 90 | 300 | | 300 |
| 4 | Methoxyethyl methacrylate monomer + 2% benzoyl peroxide | 90 | 200 | 200 | |
| 5 | Beta-morpholine amino ethyl methacrylate monomer + 2% benzoyl peroxide | 75 | 100 | 175 | |
| 6 | 100 parts ethylene glycol monomethyl ether + 100 parts isobutyl methacrylate monomer + 1 part benzoyl peroxide | 95 | 115 | 120 | |
| 7 | 90 parts methoxyethyl methacrylate monomer + 10 parts dibutyl phthalate + 2 parts benzoyl peroxide | 90 | 200 | 240 | |
| 8 | 80 parts butoxyethoxyethyl methacrylate monomer + 20 parts dicyclohexyl phthalate + 2 parts benzoyl peroxide | 80 | 100 | 100 | |
| 9 | Vinyl acetate monomer + 1% benzoyl peroxide | 90 | 120 | 140 | |

*Applied to the following coating composition:

| | Percent |
|---|---|
| Nitrocellulose, 12.5% nitrogen | 58 |
| Paraffin wax, M. P. 60° C | 4 |
| Damar resin, dewaxed | 14 |
| Dibutyl phthalate | 24 |

It is apparent that whereas ethylene glycol monomethyl ether which is one of the best of the common solvents used for sealing moistureproof coated regenerated cellulose produces a seal of constant strength over a period of time, the polymerizable liquid solvent produces an initial seal substantially equivalent to that of the ethylene glycol monomethyl ether, but has the distinct advantage of producing a seal which may be three times as strong after a short period of time or after the polymerization of the adhesive has been completed. The advantages of a seal of this strength are obvious.

The natural incompatibility of many polymerized substances, even those which may be obtained by polymerizing a polymerizable solvent such as is described in this invention, prevents their use in adhesive compositions of this general character and particularly compositions containing moistureproofing agents when attempts are made to incorporate the polymerized form in the mixtures employing volatile solvents as a medium for applying the compositions. In many instances incompatibilities result in harmful haziness, non-moistureproofness or the like. By employing a substantially non-volatile polymerizable solvent and polymerizing in situ, these difficulties, formerly insurmountable, are easily overcome.

Where a small amount of volatile solvent is not objectionable, mixtures of these polymerizable solvents and a volatile solvent will be found to give excellent results and adhesive bonds of much greater seal strength than those obtained by the use of volatile solvents alone. For instance, Example 6 of Table I gives a result of a seal strength test of such a mixture.

As exemplified by Examples 7 and 8, adhesive compositions may contain a polymerizable solvent and a non-polymerizable plasticizer to give satisfactory results in accordance with the present invention.

Numerous polymerizable liquids which will become firm upon polymerization are available for the practice of the invention, but depending on the type of adhesive desired, the choice, for certain purposes, may be more or less limited. In order to be commercially practicable it is preferred that the polymerizable solvents have the following basic requirements: (a) a sufficiently low volatility at the polymerizing temperature so that the polymerizable material will not be lost from the adhesive, (b) a sufficiently slow polymerizing rate at ordinary temperatures even in the presence of a catalyst so that the polymerization will not take place prematurely, (c) a fast polymerizing rate at elevated temperatures, such as for example at about 100° C. so that the adhesive can be quickly set up, (d) a polymerization product which is clear and hard.

Preferably, the material must show good solvent properties for resins, plasticizers, cellulose derivatives, moistureproofing agents, oils, etc. in order that it may act as a solvent for coatings present upon moistureproof films, or may be used in the proper preparation of adhesive compositions for use with uncoated material.

Included among the useful materials may be mentioned broadly vinyl compounds such as esters, ethers, hydrocarbons; derivatives of acrylic acid or its homologues, such as esters thereof; members of the indene and coumarone groups or the like, subject to the restrictions of the preceding two paragraphs. The acrylic acid derivatives, particularly esters of methacrylic acid, have been found to be well suited to the practice of the instant invention. Specifically, it has been found that cyclohexyl methacrylate, methoxyethyl methacrylate, butoxyethoxyethyl methacrylate, butyl methacrylate, isobutyl methacrylate, beta-morpholine amino ethyl methacrylate, or indene are well suited to the purposes of the invention.

The polymerizable materials may also be employed in a lowly polymerized state, or polymerized to an extent no greater than will yield liquids possessing suitable solvent action for the coating materials or adhesive constituents.

Among the substances which may serve as ingredients for the adhesive compositions may be mentioned cellulose derivatives, resins, oils, plasticizers, moistureproofing agents, fillers, dyes, etc.

As cellulose derivatives the invention contemplates a wide variety of materials including cellulose nitrate, acetate, butyrate, propionate, stearate, acetopropionate, acetonitrate, acetobutyrate, acetostearate or the like; ethyl, benzyl or methyl cellulose; mixtures of two or more of these derivatives in varying degrees of esterification or etherification commonly recognized as solvent soluble and known to the art of adhesive composition.

As resins there may be included those of the natural or synthetic varieties including rosin, rosin derivatives, damar, copal, alkyd resins of the polyhydric alcohol-polybasic acid type, halogenated diphenyl resins, polymerized vinyl ester products obtained by the polymerization of methacrylic acid derivatives, or indeed interpolymers, etc. Rubber derivatives, such as rubber hydrochloride or chlorinated rubber, hydrogenated rubber or resins obtained by the treatment of rubber with various chemical reagents including sulfuric acid, chlorostannic acid, tin tetrachloride, etc. may also find use.

Numerous placticizing compounds will be available including certain monomeric methacrylates, for example, which do not polymerize; certain methacrylates such as naphthenyl or lauryl methacrylates which polymerize only to relatively soft resinous masses. Where cellulose derivatives are employed, any of the usual cellulose derivative plasticizers may be used to advantage, such as tricresyl phosphate, dibutyl phthalate, cyclohexyl phthalate, or the like. Mixtures of plasticizers will frequently be more effective than single plasticizers.

As moistureproofing agents suitable waxes or wax-like substances will be selected. These materials will hereinafter be termed "wax materials." Thus, for example, paraffin wax, ceresin, beeswax, dinaphthoxydiethyl ether, ceryl alcohol, di-octadecyl ether, laurone, or the like may be used. In many instances hardening wax such as carnauba or montan wax may be included. Generally, the preferred moistureproofing agent will be paraffin wax of rather high melting point, say of the order of 60–62° C.

It will be noted in the above Examples A and B that a polymerization catalyst, benzoyl peroxide, is included. This is merely exemplary of one of the more convenient means of accelerating polymerization. Any of the well known catalysts may be employed, such as other organic peroxides, uranium salts or the like which are capable of catalyzing such polymerization. In some cases satisfactory polymerization may be accomplished without the use of a catalyst, as by simple heating or exposure to light rays, particularly sunlight or light rich in ultra-violet rays, for example such as is emitted from a mercury vapor lamp or the like.

The compositions described herein are useful for adhering together objects of various materials including metals, wood, textile fabrics, paper of all kinds, nonfibrous sheet materials, etc. The compositions of the present invention are particularly useful as adhesives for coated regenerated cellulose and for uncoated regenerated cellulose and other cellulosic sheet materials such as may be used for wrapping purposes. As exemplary of other cellulosic base materials may be mentioned sheets or films obtained by the coagulattion or precipitation of cellulosic materials from aqueous or alkaline aqueous dispersions or solutions, such as glycol cellose, cellose glycollic acid, lowly etherified or lowly esterified celloses such as ethyl, methyl or acetyl celluloses. Likewise, the usual types of cellulose acetate, cellulose nitrate, ethyl, methyl or benzyl cellulose sheets or films as well as sheets of mixed cellulose esters or ethers or ether-esters may be employed as the base sheet to be adhered. If desired, these adhesives may be used with sheets of rubber, rubber hydrochloride, gelatin, casein, etc.

Any of the methods well known to the art for the application of adhesives may be used. The adhesives of the instant invention will operate satisfactorily with the usual means of applying liquid adhesives employed upon automatic wrapping machinery.

The adhesive can, if desired, be applied at room temperature and allowed to set up at room temperature. In this case the adhesive will have sufficient strength to hold the joint for all practical purposes immediately after the joining operation. However, the bond will increase in strength for a period of several hours. In some cases it may be desired to set up the adhesive immediately after application. This can be accomplished by application of an elevated temperature of the order of 130° C. for a period of 1 to 5 minutes.

Polymerizable liquids of this type may be useful for the production of transparent, moistureproof or waterproof adhesive compositions. Such compositions may be extremely useful for laminating purposes as they may be applied in the liquid form at room temperature without the use of volatile solvents, possessing enough initial adhesive properties to insure intimate contact of the surfaces to be laminated until the formation of a strong bond by polymerization of the liquid ingredients of the adhesive. It may be useful, for example, to laminate two sheets of plain transparent regenerated cellulose film with a moistureproof adhesive of this type to produce a film in which the moistureproof layer is physically protected.

It will be apparent that the compositions of this invention will be useful for many purposes which require a strong adhesive. The adhesive composition of the invention produces a strength of seal which is superior to that obtained with many adhesives now used for the purposes for which it is suited. Furthermore, the use of these novel adhesive compositions eliminates the difficulties and disadvantages of a volatile solvent such as the hazards of fire, explosion, toxicity, odor, solvent recovery, or incompatibility. These adhesive compositions are particularly useful for producing laminated structures having a high degree of flexibility, transparency, moistureproofness as well as protection against water, oil, grease and other influences.

Since many obvious changes and modifications can be made in the details above described without departing from the nature and spirit of the invention, it is to be understood that the invention is not to be limited except as set forth in the appended claims.

I claim:

1. The process of adhering two plies of moistureproof, non-fibrous cellulosic sheet, said sheet having a moistureproofing coating comprising essentially resin, wax and cellulose derivative material, which comprises applying polymerizable methoxyethyl methacrylate to a ply, joining the plies at the place treated with methacrylate, and thereafter polymerizing said methacrylate while it joins the two plies.

2. The process of adhering two plies of moistureproof, non-fibrous cellulosic sheet, said sheet having a moistureproofing coating comprising essentially resin, wax and cellulose derivative material, which comprises applying polymerizable beta-morpholine amino ethyl methacrylate to a ply, joining the plies at the place treated with methacrylate, and thereafter polymerizing said methacrylate while it joins the two plies.

3. The process of adhering two plies of moistureproof, non-fibrous cellulosic sheet, said sheet having a moistureproofing coating comprising essentially resin, wax and cellulose derivative material, which comprises applying non-volatile methacrylic acid derivative material which will become firm as a result of polymerization thereof, to a ply, joining the plies at the place treated with the methacrylic acid derivative material, and thereafter polymerizing, said methacrylic acid derivative material being from the group consisting of cyclohexyl methacrylate, methoxyethyl methacrylate, butoxyethoxyethyl methacrylate, butyl methacrylate, isobutyl methacrylate and beta-morpholine-amino-ethyl methacrylate.

4. The process of adhering two plies of transparent, moistureproof, non-fibrous regenerated cellulose sheet and the like, said regenerated cellulose sheet having moistureproofing coating comprising essentially resin, wax and cellulose derivative, which comprises applying non-volatile methacrylic acid derivatives material which will become firm as a result of polymerization thereof to one ply, joining the plies at the place treated with the methacrylic acid derivative and thereafter polymerizing said methacrylic acid derivative while it joins the two plies, said methacrylic acid derivatives material being from the group consisting of cyclohexyl methacrylate, methoxyethyl methacrylate, butoxyethoxyethyl methacrylate, butyl methacrylate, isobutyl methacrylate and beta-morpholine-amino-ethyl methacrylate.

5. The process of adhering two plies of transparent, moistureproof, non-fibrous regenerated cellulose sheet and the like, said regenerated cellulose sheet having moistureproofing coating comprising essentially resin, wax and cellulose derivative, which comprises applying polymerizable cyclohexyl methacrylate to a ply, joining the plies at the place treated with the cyclohexyl methacrylate, and thereafter polymerizing said cyclohexyl methacrylate while it joins the two plies.

6. Two plies of transparent, moistureproof, non-fibrous regenerated cellulose sheet having a moistureproofing coating comprising essentially resin, wax and cellulose derivative adhesively secured together with a methacrylic acid derivative material from the group consisting of cyclohexyl methacrylate, methoxyethyl methacrylate, butoxyethoxyethel methacrylate, butyl methacrylate, isobutyl methacrylate and beta-morpholine-amino-ethyl methacrylate polymerized in situ at the place of adhesion.

7. Two plies of transparent, moistureproof, non-fibrous regenerated cellulose sheet having a moistureproofing coating consisting of:

| | Per cent |
|---|---|
| Nitrocellulose (12.5% N) | 58 |
| Paraffin wax (M. P. 60° C.) | 4 |
| Damar resin (dewaxed) | 14 |
| Di-butyl phthalate | 24 | adhesively secured together with a methacrylic acid derivative material from the group consisting of cyclohexyl methacrylate, methoxyethyl methacrylate, butoxyethoxyethyl methacrylate, butyl methacrylate, isobutyl methacrylate and beta-morpholine-amino-ethyl methacrylate polymerized in situ at the place of adhesion.

8. The process of adhering two plies of transparent, moistureproof, non-fibrous regenerated cellulose sheet and the like, said regenerated cellulose sheet having moistureproofing coating consisting of:

| | Per cent |
|---|---|
| Nitrocellulose (12.5% N) | 58 |
| Paraffin wax (M. P. 60° C.) | 4 |
| Damar resin (dewaxed) | 14 |
| Di-butyl phthalate | 24 | which comprises applying non-volatile methacrylic acid derivative material which will become firm as a result of polymerization thereof to one ply, joining the plies at the place treated with the methacrylic acid derivative and thereafter polymerizing said methacrylic acid derivative while it joins the two plies, said methacrylic acid derivative material being from the group consisting of cyclohexyl methacrylate, methoxyethyl methacrylate, butoxyethoxyethyl methacrylate, butyl methacrylate, isobutyl methacrylate and beta-morpholine-amino-ethyl methacrylate.

JAMES A. MITCHELL.